Jan. 20, 1959     F. R. PERSON     2,869,906
ASSEMBLY FOR CONNECTING PARALLEL ROPE SECTIONS
Filed Aug. 31, 1955
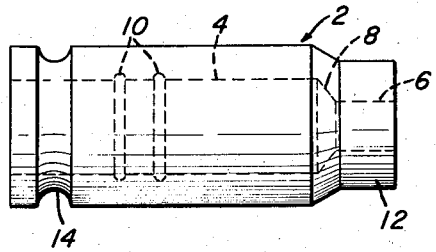
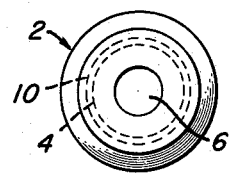
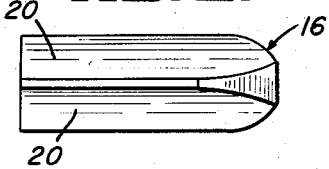
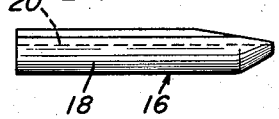
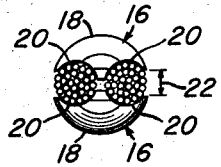
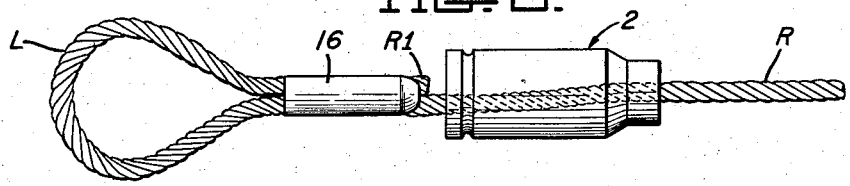
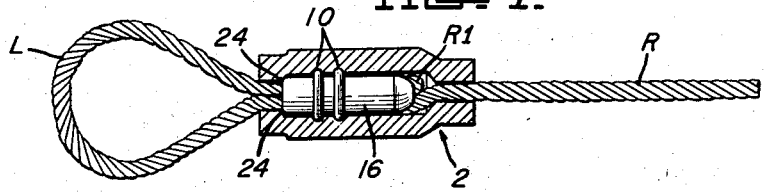
INVENTOR:
FRANK R. PERSON,
BY: Donald G. Dalton
his Attorney.

2,869,906

ASSEMBLY FOR CONNECTING PARALLEL ROPE SECTIONS

Frank R. Person, New Haven, Conn., assignor to United States Steel Corporation, a corporation of New Jersey Application August 31, 1955, Serial No. 531,762

2 Claims. (Cl. 287—78)

This invention relates to an assembly for connecting parallel rope sections and more particularly for connecting one end of a wire rope to a parallel section of the same rope to form a loop. Ordinarily, a loop is formed in a wire rope by braiding or splicing, this being an expensive operation.

It is therefore an object of my invention to provide a fitting adapted to connect parallel rope sections.

This and other objects will be more apparent after referring to the following specification and attached drawings, in which:

Figure 1 is an elevational view of a fitting used in my invention;

Figure 2 is an end view of the fitting of Figure 1;

Figure 3 is a plan view of an insert used with the fitting of Figure 1;

Figure 4 is an elevation of the insert of Figure 3;

Figure 5 is an end view of the insert of Figure 3 showing it in assembly with a similar insert around a wire rope;

Figure 6 is a view of the connection assembly in one stage of its operation; and Figure 7 is a sectional view of the completed connection.

Referring more particularly to Figures 1 and 2 of the drawings, reference numeral 2 indicates a generally cylindrical body member made of swageable material such as steel. The body member 2 has an axial opening 4 therethrough which has a reduced diameter portion 6 at one end. A tapered portion 8 connects the reduced diameter portion 6 to the main part of the opening. A plurality of annular grooves 10 are provided around the opening 4 at the end opposite the reduced diameter portion 6. The body member 2 preferably has a reduced diameter portion 12 at the same end as the reduced diameter opening 6. An annular groove 14 is provided in the outer surface of the body member 2 at the end opposite portion 12. The fitting also includes a pair of inserts 16 which are made of material softer than that of body 2, such as spelter or soft brass. Each of the inserts has a cylindrical outer surface 18 of substantially the same diameter as the main portion of the axial opening 4. Each of the inserts 16 has a pair of grooves 20 on their inner surface, the radius of the groove being substantially the same as that of wire rope R.

In assembling the fitting end R1 of the rope R is passed through the axial opening 4 from the end adjacent the reduced diameter portion 6 and bent back upon the main portion of the rope R and laid parallel thereto with a loop L being formed in the rope as shown in Figure 6.

The inserts 16 are placed around parallel sections of the rope R. In this position, as seen in Figure 5, a small space 22 is provided between the inserts 16. The inserts 16, along with the assembled rope sections, are moved axially into the opening 4 from the position shown in Figure 6 until they become wedged into position. The body member 2 is then swaged, thus reducing its outer diameter and also forcing the material beyond the groove 14 inwardly as shown in Figure 7, so that it forms an abutment 24 which prevents the inserts 16 from moving outwardly. At the same time the material of the inserts 16 is forced into the interstices of the rope R and into the internal grooves 10, thus forming a firm grip on the parallel sections of the rope R.

While one embodiment of my invention has been shown and described it will be apparent that other adaptations and modifications may be made without departing from the scope of the following claims.

I claim:

1. An assembly comprising a generally cylindrical body member of swageable material, said body member having an axial opening therethrough with reduced diameter portions at each end, said axial opening having internal annular grooves therein between the reduced diameter portions, a pair of inserts in said axial opening between said reduced diameter portions in close contact with the walls thereof, projections on each of said inserts projecting into said internal annular grooves, each of said inserts being made of softer material than said body member and having a pair of matching generally semi-circular grooves in their inner surface, and two parallel rope sections one received in each of the pair of grooves of each insert with the metal of the inserts extending into the interstices of the rope.

2. An assembly comprising a generally cylindrical body member of swageable material, said body member having an axial opening therethrough with reduced diameter portions at each end, said axial opening having internal annular grooves therein between the reduced diameter portions, a pair of inserts in said axial opening between said reduced diameter portions in close contact with the walls thereof, projections on each of said inserts projecting into said internal annular grooves, each of said inserts being made of softer material than said body member and having a pair of matching generally semi-circular grooves in their inner surface, a wire rope extending through the first of said reduced diameter portion into one of the grooves of each insert and then through the second of said reduced diameter portions and outwardly in the form of an eye with the end of said rope extending back through said second reduced diameter portions into the other of the grooves of each insert, the metal of the inserts extending into the interstices of the rope.

References Cited in the file of this patent

UNITED STATES PATENTS

| Re. 20,074 | Stahl | Aug. 18, 1936 |
| 1,643,110 | Briggs | Sept. 20, 1927 |
| 2,252,448 | Van Nest | Aug. 12, 1941 |
| 2,357,733 | Guderian | Sept. 5, 1944 |

OTHER REFERENCES

Gilmore, Abstract Ser. No. 681,272, published O. G. vol. 642, page 332, Jan. 2, 1951.